2,786,741
Patented Mar. 26, 1957

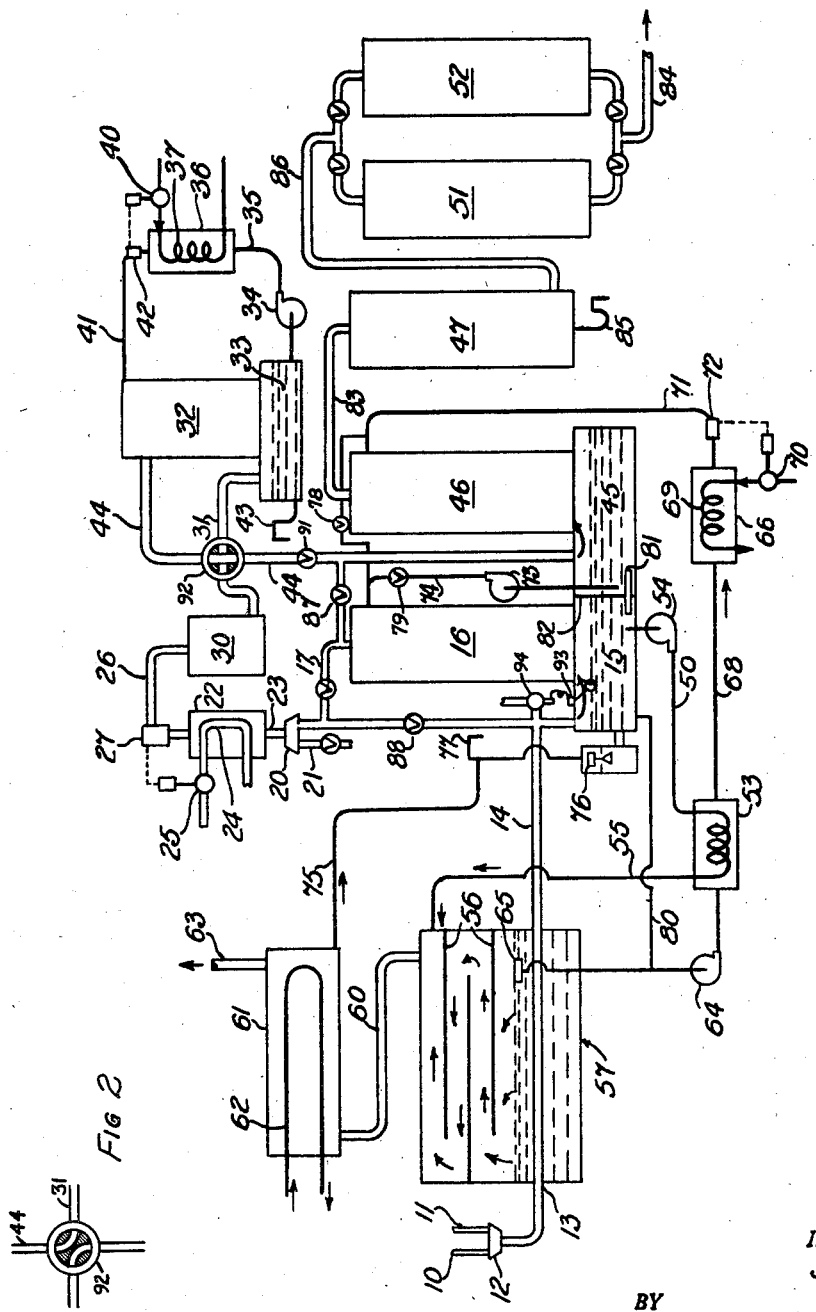

2,786,741
METALLURGICAL GAS GENERATOR

Jack Huebler, Sylvania, and Donald Beggs, near Toledo, Ohio, assignors to Surface Combustion Corporation, Toledo, Ohio, a corporation of Ohio Application February 16, 1956, Serial No. 565,913

8 Claims. (Cl. 23—281)

This invention relates to a method and apparatus for generating a hydrogen containing nitrogen gas for metallurgical purposes.

When steel is to be coated with zinc or tin, the success of the operation and more particularly the adherence and protective qualities of the coated product depend upon the relative cleanliness of the surface of the steel to be coated. Foreign substances on the steel at the time of coating, such as oil, carbon, oxides and the like will cause the coating to be porous or nonadherent. For these reasons a heat treating atmosphere for protecting the steel to be coated must not only maintain a clear surface, but also remove foreign materials and thereby yield a clean surface. Various atmospheres have been proposed for this purpose. Thus an atmosphere commonly employed consists of a mixture of gases in the following approximate proportions, namely:

CO=10%   $H_2$=12%   $CH_4$=½%
$CO_2$=5%   $H_2O$=1%   $N_2$=71½%

This gas tends to deposit carbon on work below 1200° F. and will oxidize steels under certain conditions, but it is still widely used today where absolute cleanliness of the surface of the metal is not required. Although these effects are usually not apparent to the eye, even when viewed under a microscope, the results are easily discernible in the coated product. This gas is produced by direct combustion of fuel and air with subsequent partial removal of the water from the product gases by condensation. It is known that an atmosphere consisting primarily of nitrogen with approximately two percent carbon monoxide and two percent hydrogen with only trace quantities of water vapor and impurities has less tendency to deposit carbon and to oxidize, generally attributed to the reduced carbon and oxygen content, and it has in fact produced very improved results; and it is known that the use of an atmosphere consisting of nitrogen with from approximately one to twelve percent hydrogen with only trace quantities of impurities the maximum $CO_2$ content being about 0.1% will result in a vastly superior coated product, especially the adherence and lack of porosity of the coated product and the superior protection afforded to the base metal by even thinner coatings where this atmosphere gas has been used. The present invention relates to a process and apparatus for producing this last mentioned hydrogen containing nitrogen gas.

For a consideration of what we consider to be novel and our invention, attention is directed to the following disclosure and the claims appended thereto.

In the drawing,

Figure 1 is a diagrammatic representation of the improved gas generating apparatus.

Figure 2 shows an alternate position of a valve in Figure 1.

Carbonaceous fuel (preferably natural gas) and air from supply pipes 10 and 11 respectively, are mixed in a mixer 12 and burned in a combustion chamber formed by a tube 13, which is immersed in a solution, causing the solution to boil vigorously, thus cooling the combustion product gas. The proportions of air and gas burned may be varied to produce a rich gas containing in practice, from about ½ to 7% hydrogen. This gas, now relatively cool, is conducted from tube 13 by a pipe 14 to the sump 15 of an absorber 16, valve 88 being closed, and then passes through absorber 16 in counterflow to a carbon dioxide absorbing solution which effectively removes carbon dioxide from the gas. As disclosed in Patent No. Re. 18,958 numerous solutions are known to the art for this purpose. This absorbing solution may be a ten to fifteen percent water solution of monoethanolamine. The water vapor contained in the gas is reduced by condensation to about saturation at the entering temperature of the absorbing solution in absorber 16. With valve 87 normally closed, process gas in pipe 17, from absorber 16, is admixed with steam in mixer 20, the steam being supplied from pipe 21. The volume of steam, added to influence the water gas shift reaction, is preferably one-half that of the process gas entering mixer 20. If no steam is added to the gas, its moisture content will be determined by the temperature of the monoethanolamine solution, and at the conventional operating temperature of about 120° F. the moisture, or water vapor, content will be about 11½% by volume. The mixture of steam and gas enters an indirect heater 22 by pipe 23 wherein the process gas mixture is heated to a suitable temperature, preferably about 600° F. to 1000° F. Heat is preferably supplied by combustion of fuel gas and air in a radiant tube 24 controlled by valve 25 to maintain the desired temperature in outlet pipe 26 as sensed by element 27.

The heated mixture of gas and steam passes from pipe 26 into a tower 30 wherein it contacts a suitable catalyst capable of promoting the water gas shift reaction: $CO+H_2O=CO_2+H_2$. Many such catalysts are commercially available, usually comprising iron oxide and at least one of a variety of stabilizers and promoters. The gas leaving catalyst tower 30 has a reduced concentration of carbon monoxide due to catalytic conversion to carbon dioxide, the concentration being about .02% to .004%. The concentration of hydrogen is correspondingly increased in the same reaction to a usual maximum of about double the original hydrogen content of ½ to 7% making possible a hydrogen content of approximately 1 to 14% without excess of free oxygen or hydrocarbon.

The hot gas passing from catalyst tower 30 passes through pipe 31 to a direct cooler 32 wherein the gas is cooled, and condensibles, primarily excess steam, are condensed. Condensate in sump 33 of the cooler 32 is circulated by pump 34 through pipe 35 to an indirect cooler 36 wherein cooling water is passed through a cooling coil 37 and is controlled by a valve 40 to maintain a desired condensate temperature in the outlet pipe 41 as sensed by element 42. Condensate from pipe 41 is sprayed over suitable packing in the direct cooler, there contacting the hot gas passing through the cooler. Excess condensate in the sump 33 is allowed to overflow through a pipe 43 for drain to a sewer. An advantage of the condensate type of cooler described is that when solution carryover from the first absorber is passed through the converter, the breakdown products—gums, tars and the like—due to the presence of solution in the gas passing through the converter are condensed and removed by the condensate spray, and impact of the hot gases on a tubular heat exchanger with resultant gum deposits is avoided; the gums, etc., being carried in the overflow to the server. This condensate cooler system is described in greater detail in patent to Martin, 2,714,552.

Cooled gas passes through a pipe 44 from the direct cooler 32 to the top side of the sump 45 of a second absorber tower 46, thence through the tower 46 wherein it is washed by counter-flowing carbon dioxide absorbing solution. The gas leaving absorber tower 46 in pipe 83 is substantially saturated with water vapor, but contains only traces of carbon oxide gases. Inasmuch as this water vapor content is higher than is generally desired for metallurgical uses, the gas is dried so that its composition as it leaves the entire unit in pipe 84 is almost entirely nitrogen and hydrogen. This is done by refrigerating and condensing water vapor in refrigerator 47, and subsequently drying by chemical absorption in alternately used alumina driers 51 and 52. Condensate from the refrigerator will be removed in trap 85 as gas passes through conduit 86 to be further dried. The preferred way of operating the alumina driers is described in detail in patent to Beggs 2,712,981. Excess steam is removed in direct cooler 32 primarily to avoid excessive dilution of the absorbing solution in absorber 46.

The carbon dioxide absorbing solution, after passing through absorber towers 16 and 46 is passed by a pump 54 through pipe 50, through a liquid to liquid heat exchanger 53 and thence by a pipe 55 to condensing plates 56 of a stripper wherein carbon dioxide containing absorbing solution is boiled when heated by the burning of fuel in tube 13 which passes therethrough. Steam and carbon dioxide, together with a small percent of absorbing solution, pass from condensing plates 56 of a stripper 57 and thence through pipe 60 to a condenser 61 cooled by water passing through a cooling coil 62 of the condenser. Water vapor and absorbing solution are condensed from the carbon dioxide gas from the stripper, and the balance of the gas is vented through pipe 63.

Regenerated hot absorbing solution is pumped by pump 64 from a weir 65 in stripper 57 through heat exchanger 53 wherein it flows countercurrent to the cool absorbing solution passing from the absorber towers to the stripper, thence through pipe 68 to a cooler 66 wherein water passing through coil 69 is controlled by valve 70 to further cool and maintain a desired temperature of solution leaving the cooler through pipe 71 as sensed by element 72.

The cooled and regenerated absorbing solution passes through pipe 71 to absorber tower 46 wherein it contacts the gas passing therethrough, absorbing the carbon dioxide formed in catalyst tower 30 and condensing such water vapor as the difference in temperatures of this absorbing solution and the recirculating condensate in direct cooler 32 determine.

Absorbing solution passes through sump 45 of absorber tower 46 and is pumped by a pump 73 through pipe 74 to absorber tower 16 wherein it contacts the gas from tube 13, absorbing carbon dioxide and condensing excess water vapor from the products of combustion. Absorbing solution leaves sump 15 of absorber tower 16 by pipe 50 and is pumped by pump 54 through heat exchanger 53 as aforesaid. The water of the solution system is being constantly added to by condensate from the combustion products from combustion tube 13 and to a small extent from the excess steam not condensed in direct cooler 32. The condenser 61 is designed to condense water vapor and a small proportion of absorbing solution from the stripped gases, primarily carbon dioxide, leaving the stripper. This condensate is passed through pipe 75 to a float control 76 in sump 15 of absorber tower 16. This control allows make up condensate from condenser 61 to be added to sump 15 as required, the balance overflowing through pipe 77 to the sewer.

To allow for variations in pump capacities and the practical impossibility of setting pumps 54, 64 and 73 to the exact flows desired, the variations of flow are corrected by a system of by pass pipes together with a weir in the stripper 57. If more solution is delivered to the stripper by pump 54 than pump 64 is adjusted to remove, the excess flows by gravity from the intake side of pump 64 through pipe 80 to sump 15 of the first absorber tower and contrarywise, if pump 64 is set to deliver more solution than flows over weir 65, it draws excess solution from sump 15. The small differential flows through pipe 80 are not sufficient to materially affect the concentration or temperature of solutions, but small unbalances of solution flow could gradually empty a sump, vapor lock a pump or cause foaming.

In like manner so that the sump levels of absorber sumps 15 and 45 may be equal in spite of slight variations of rates of flow into and out of the sumps, pipe 81 connects the sumps 15 and 45, allowing a differential flow to maintain equal flows, and allowing a single float valve or control 76 to control the solution levels in both sumps. It will be observed that the flow of solution is substantially in series through the second absorber tower 46 and the first absorber tower 16 in spite of pipe 81 connecting the two sumps. Separation of the sumps by dividing wall 82 therebetween adequately controls flow of gas through the first absorber tower, through catalytic water gas shift conversion unit 30, and then through the second absorber tower. This differential solution flow compensating circuit is described in greater detail in patent to Peters 2,635,039.

The apparatus as described will produce optimum gas of from .02% to as little as .004% carbon monoxide. When more carbon monoxide can be tolerated the apparatus may be simplified by omission of absorber tower 16 and solution circulation pump 73. Thus in the apparatus as shown, the gas from pipe 14 will then pass through normally closed valve 88 and the valve in pipe 17 will be closed.

Pump 73 will be off, and solution from sump 45 will pass through pipe 81 to sump 15, thence into pump 54 and the unit will operate normally in other respects.

At times when conversion catalyst tower 30 and the cooling system are not needed and a carbon monoxide content above 2% in the final gas is not objectionable, or in case of breakdown in the above units, the gas from first absorber tower 16 may be bypassed from pipe 17 to pipe 44 through normally closed valve 87, closing suitable valves 90 and 91 in pipes 17 and 44 respectively to isolate the conversion units and make a more conventional gas with upwards of two percent carbon monoxide.

It is sometimes desired to operate the solution supply system as a parallel flow system rather than as a series flow system as heretofore described. This is done by opening valve 78 to pass solution from pump 64 directly to absorber 16. Valve 79 may be closed in pipe 74 to make the solution flow entirely parallel, or a combination may be obtained as desired by proper adjustment of valves 78 and 79. If an entirely parallel flow system is to be used, pump 73 could be dispensed with, but pumps 64 and 54 would have to handle greater flow rates to properly wet the packings normally used in the absorber towers 16 and 46.

If it is desired to take the condensate cooler off the line for repairs or other reasons, valve 92 may be adjusted from its position as shown in Fig. 1 to the position shown in Fig. 2, this being preferably an axially movable valve body whose connections are schematically shown. Thus gas from the catalyst chamber 30 will pass directly to the second absorber 46, with the result that more condensate will be obtained in the second absorber. In this case the parallel solution flow system with valve 78 open is normally preferred.

The additional condensate in the solution is removed in the stripper 57 by boiling. The additional heat required for the purpose may be automatically obtained by a liquid level control 93 in one of the absorber sumps which responds to liquid volume in the sumps, hence in the total solution circuit, and operates a vent valve 94 in pipe 14 to vent gas therefrom as solution level rises. This will maintain solution volume substantially constant, and will make unnecessary the condenser cooler 61. Obviously condenser 61, valve 76, and the condensate cooler system may be dispensed with and the need for cooling water for coils 62 and 37 avoided in short water supply areas, with only minor additional cooling water required for coil 69, and this at a compensating cost substantially limited to the supply of additional fuel in pipe 10 to supply the extra heat necessary to boil off the additional steam condensed in the second absorber 52 which would otherwise be withdrawn as condensate through pipe 43.

This invention utilizes the steps of producing a rich flue gas, absorbing $CO_2$ therefrom, converting the carbon monoxide of the gas to carbon dioxide and hydrogen by the water gas shift and removing carbon dioxide from the gas to produce a hydrogen containing nitrogen gas. The step of removing carbon dioxide from the flue gas in absorber tower 16 before passing the gas through the catalytic conversion of $CO+H_2O=CO_2+H_2$, (the water gas shift) makes the apparatus much more efficient in removal of CO from the gas and making possible the production of a gas containing less than 0.02% carbon monoxide and substantially no carbon dioxide.

This is illustrated by the following Tables A and B wherein the figures are calculated figures from known data and correspond well with actual test results.

TABLE A

[Reaction before removal of initial $CO_2$; absorber tower 16 by-passed.]

|  |  | Volume of Combustion Gases | Volume Of Steam Added | CO Content of Product Gas, Percent | Total Volume Through Catalyst |
|---|---|---|---|---|---|
| Run #1 | $CO_2$ | 122 | 500 | .075 | 1,867 |
|  | CO | 18 |  |  |  |
|  | $H_2$ | 18 |  |  |  |
|  | $H_2O$ | 245 |  |  |  |
|  | $N_2$ | 964 |  |  |  |
| Run #2 | $CO_2$ | 122 | 2,500 | .020 | 3,867 |
|  | CO | 18 |  |  |  |
|  | $H_2$ | 18 |  |  |  |
|  | $H_2O$ | 245 |  |  |  |
|  | $N_2$ | 964 |  |  |  |

TABLE B

[Reaction after removal of intial $CO_2$; absorber tower 16 used.]

|  |  | Volume of Combustion Gases | Volume Of Steam Added | CO Content of Product Gas, Percent | Total Volume Through Catalyst |
|---|---|---|---|---|---|
| Run #3 | $CO_2$ | 10 | 500 | .020 | 1,580 |
|  | CO | 18 |  |  |  |
|  | $H_2$ | 18 |  |  |  |
|  | $H_2O$ | 70 |  |  |  |
|  | $N_2$ | 964 |  |  |  |
| Run #4 | $CO_2$ | 10 | 2,500 | .004 | 3,580 |
|  | CO | 18 |  |  |  |
|  | $H_2$ | 18 |  |  |  |
|  | $H_2O$ | 70 |  |  |  |
|  | $N_2$ | 964 |  |  |  |

From the foregoing tables it may be seen that with equivalent amounts of steam the carbon monoxide removal is from 4 to 5 times more efficient if the carbon dioxide is removed from the products of combustion before the catalytic conversion of carbon monoxide to carbon dioxide. Likewise to gain the same degree of removal of carbon monoxide only one-fifth as much steam is required if the carbon dioxide is removed prior to the conversion. For the production of equivalent gases 2.5 times as great a volume of gases must pass through the catalyst where $CO_2$ is not removed prior to the catalytic conversion step. This means more gases to be heated to the 600° F. to 1000° F. reaction temperature, and greater pressure drop across the catalyst bed as well as a reduction of the degree of reaction due to the reduced reaction time, a factor not included in the computations of Tables A and B, which further emphasizes the benefit of the prior removal of $CO_2$ before the catalytic conversion step.

The advantages of this invention become more apparent in the light of the deleterious effects of oxygen, carbon monoxide and methane on steels for tin plate use and the like, the impossibility of producing oxygen free flue gas by direct combustion which has less than about 2% carbon monoxide, and the impossibility of producing in the same way a gas containing over 7% carbon monoxide and 7% hydrogen without also producing methane. The process and apparatus of this invention allow reduction of deleterious impurities beyond prior chemical limitations and with corresponding control over beneficial hydrogen content, making possible improved quality of coated steel.

This application is a continuation-in-part of our application Serial No. 501,587, filed April 15, 1955, now abandoned, which was in turn a continuation of our application Serial No. 189,398 filed October 10, 1950, now abandoned.

We claim:

1. In apparatus for producing a hydrogen containing nitrogen metallurgical gas substantially free from oxygen and oxides of carbon and comprising a stripper including a stripper sump for a body of $CO_2$ absorbing solution, a first absorber including a first sump for $CO_2$ absorbing solution, a second absorber including a sump for $CO_2$ absorbing solution, a first liquid conduit for solution passing from the stripper to the second adsorber, a second liquid conduit for solution passing from the second absorber to the first absorber, a third liquid conduit for solution passing from the first absorber to the stripper, heat conducting wall means immersed in the solution in the stripper sump and forming a chamber therein, burner means for burning carbonaceous fuel and air and supplying products of combustion and heat therefrom to the chamber, a first gas conduit for passing gas from the chamber to the first absorber, a second gas conduit for passing gas from the first absorber to the second absorber, and a product gas outlet from the second absorber, the improvement which comprises means forming a catalyst chamber for a water-gas shift catalyst in the second gas conduit, a heater for heating gas in the second gas conduit before the gas contacts the water-gas shift catalyst, and a cooler for cooling gas in the second gas conduit between the catalyst chamber and the second absorber.

2. In apparatus according to claim 1 the improvement which comprises a liquid-liquid heat-exchanger for transferring heat from solution in the first liquid conduit to solution in the third liquid conduit, and a direct contact gas-liquid heat exchanger for transferring heat from the $CO_2$ and steam gas stream leaving the stripper to the solution in the third liquid conduit between the liquid-liquid heat exchanger and the stripper sump.

3. Apparatus according to claim 1 wherein the gas cooler in the second gas conduit is a condensate cooler wherein the gas is cooled by direct contact with recirculating condensate, and the condensate is indirectly cooled.

4. In apparatus for producing a hydrogen containing nitrogen metallurgical gas substantially free from oxygen and oxides of carbon and comprising a stripper including a stripper sump for a body of $CO_2$ absorbing solution, a first absorber including a first sump for $CO_2$ absorbing solution, a second absorber including a sump for $CO_2$ absorbing solution, a first liquid conduit for solution passing from the stripper to the second absorber, a second liquid conduit for solution passing from the second absorber to the first absorber, a third liquid conduit for solution passing from the first absorber to the stripper, heat conducting wall means contacting the solution in the stripper sump and forming a chamber, burner means for burning carbonaceous fuel and air and supplying products of combustion and heat therefrom to the chamber, a first gas conduit for passing gas from the chamber to the first absorber, a second gas conduit for passing gas from the first absorber to the second absorber, and a product gas outlet from the second absorber, the improvement which comprises means forming a catalyst chamber for a water-gas shift catalyst in the second gas conduit, a heater for heating gas in the second gas conduit before the gas contacts the water-gas shift catalyst, a cooler for cooling gas in the second gas conduit between the catalyst chamber and the second absorber.

5. In apparatus for producing a hydrogen containing nitrogen metallurgical gas substantially free from oxygen and oxides of carbon and comprising a stripper including a stripper sump for a body of $CO_2$ absorbing solution, a first absorber, a second absorber, first liquid conduit means for delivering solution from said sump to said absorbers for contacting gas therein and absorbing $CO_2$ from said gas, second liquid conduit means for returning solution from said absorbers to said stripper for regeneration therein by removal of $CO_2$ from the solution, heat conducting wall means contacting the solution in the stripper sump and forming a chamber, burner means for burning carbonaceous fuel and air and supplying products of combustion and heat therefrom to the chamber, a first gas conduit for passing gas from the chamber to the first absorber, a second gas conduit for passing gas from the first absorber to the second absorber, and a product gas outlet from the second absorber, the improvement which comprises means forming a catalyst chamber for a water-gas shift catalyst in the second gas conduit, and a heater for heating the gas in the second gas conduit which contacts the water-gas shift catalyst.

6. Apparatus according to claim 5 and comprising vent means for venting a portion of the gas from the first gas conduit, an absorber sump in at least one of said absorbers, and control means responsive to solution level in said absorber sump for operating said vent means.

7. In apparatus for producing a hydrogen containing nitrogen metallurgical gas substantially free from oxygen and oxides of carbon and comprising a stripper including a stripper sump for a body of $CO_2$ absorbing solution, a first absorber, a second absorber, first liquid conduit means for delivering solution from said sump to said absorbers for contacting gas therein and absorbing $CO_2$ from said gas, second liquid conduit means for returning solution from said absorbers to said stripper for regeneration therein by removal of $CO_2$ from the solution, heat conducting wall means contacting the solution in the stripper sump and forming a chamber, burner means for burning carbonaceous fuel and air and supplying products of combustion and heat therefrom to the chamber, a first gas conduit for passing gas from the chamber to the first absorber, a second gas conduit for passing gas from the first absorber to the second absorber, and a product gas outlet from the second absorber, the improvement which comprises means forming a catalyst chamber for a water-gas shift catalyst in the second gas conduit, a heater for heating the gas in the second gas conduit which contacts the water-gas shift catalyst, and a cooler for cooling gas in the second gas conduit between the catalyst chamber and the second absorber.

8. Apparatus according to claim 7 wherein said first liquid conduit means delivers solution from said stripper sump to said second absorber, and from said second absorber to said first absorber.

No references cited.